United States Patent [19]

Tennyson

[11] 4,294,663
[45] Oct. 13, 1981

[54] METHOD FOR OPERATING A COKE QUENCH TOWER SCRUBBER SYSTEM

[75] Inventor: Richard P. Tennyson, Fort Myers, Fla.

[73] Assignee: Munters Corporation, Fort Myers, Fla.

[21] Appl. No.: 160,744

[22] Filed: Jun. 18, 1980

[51] Int. Cl.³ .................... C10B 39/08; B01D 47/00
[52] U.S. Cl. ................................... 201/39; 55/233; 55/257 PV; 202/227; 202/263; 261/112
[58] Field of Search ................ 201/39; 202/227, 263; 55/233, 259, 257 PV; 261/112

[56] References Cited

U.S. PATENT DOCUMENTS

| | | | |
|---|---|---|---|
| 2,975,106 | 3/1961 | Becker | 202/227 X |
| 3,033,764 | 5/1962 | Hannes | 202/227 |
| 3,450,393 | 6/1969 | Munters | 261/112 |
| 3,876,143 | 4/1975 | Rossow et al. | 202/227 X |
| 4,145,195 | 3/1979 | Knappstein et al. | 202/227 X |
| 4,157,250 | 6/1979 | Regehr et al. | 55/233 |
| 4,213,827 | 7/1980 | Caldron | 202/227 X |

FOREIGN PATENT DOCUMENTS 1067775 10/1959 Fed. Rep. of Germany ...... 202/227

Primary Examiner—Frank W. Lutter
Assistant Examiner—Roger F. Phillips
Attorney, Agent, or Firm—Curtis, Morris & Safford

[57] ABSTRACT

A method of quenching coke and scrubbing the resulting gases is disclosed in which a supply of hot coke is placed in an enclosed tower having an open top and subjected to water deposited on it from above. The water is first passed through at least one layer of a liquid gas contact body formed of corrugated sheets of material arranged with the corrugations in each adjacent sheet crossing each other. This water passes in countercurrent relation to the gases rising from the quenched coke and, as a result, particulate matter, liquid drops and water-soluble vapors in the gases are removed in the contact body. The gases passing from the contact body are then passed through a mist-eliminator structure to remove water droplets therefrom.

8 Claims, 2 Drawing Figures

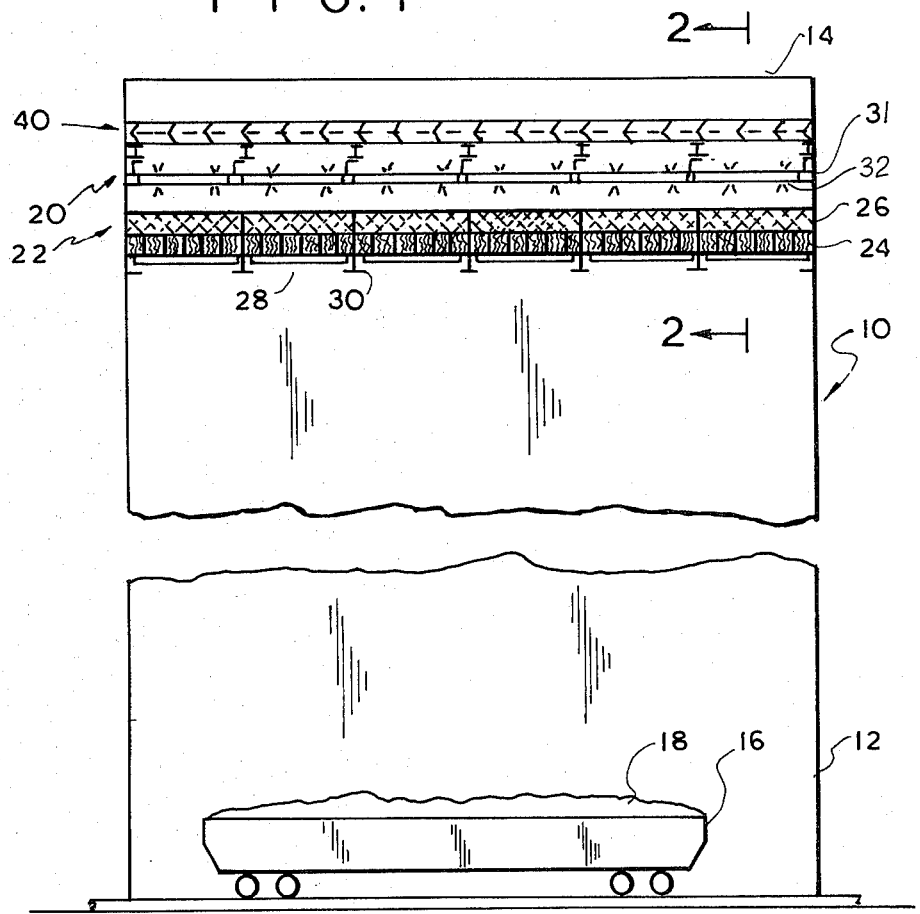
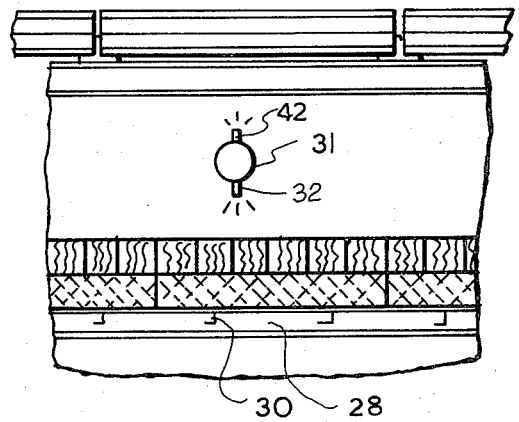

METHOD FOR OPERATING A COKE QUENCH TOWER SCRUBBER SYSTEM

The present invention relates to coke-quenching towers, in particular to a coke-quenching tower which will remove particulate matter, liquid drops and water-soluble vapors from coke quenching gases.

In the manufacture of coke, coal is subjected to high temperature in coking ovens for extended periods of time, for example, 16 to 17 hours. The resulting hot coke is then quenched to reduce its temperature quickly. Typically, this is done by transporting the coke to a quench tower in which water is sprayed directly on to the hot coke, cooling it from approximately 2000° F. to 180° F. The heat from the coke is transferred to the water, a portion of which evaporates and is discharged as vapor through the top of the tower. The discharged vapors contain undesirable particulate matter and gases, which contribute to air pollution. The typical quenching tower simply contains rows of wooden baffles located in staggered relation to each other at the top of the tower to collect water droplets and particles by inertial impact against the baffles. While such arrangements serve to eliminate some of the undersirable constituents of the discharge gases from the coke quenching tower they are not entirely satisfactory and may not satisfy more stringent air pollution control standards.

One proposed method of dealing with such pollutants is to use conventional gas-scrubbing systems as are now available to utilities in other industries. However, such conventional systems require very large pressure-drop scrubbers using venturies, high horsepower blowers, or other expensive equipment which is difficult to install and maintain. Such scrubbers would prevent the coke quenching tower from operating on a natural draft principle, as most now do, and thus would be exceedingly expensive.

Accordingly, it is an object of the present invention to provide a method of scrubbing gases in a coke quenching tower which is relatively simple and inexpensive.

Another object of the present invention is to provide an improved method of gas scrubbing in a coke quenching tower which can operate with the natural draft of the tower.

A further object of the present invention is to provide an improved gas scrubbing system for a coke quenching tower. In accordance with an aspect of the present invention, coke is quenched and the resulting gases scrubbed by supplying the hot coke to a quenching tower having an open top. The tower shell may be of conventional construction. Water is deposited on the coke from above and particulate matter and water-soluble vapors from the gases produced by the contact of the water with the hot coke, are removed by passing the gases and the water, before contact with the hot coke, in countercurrent relation through at least one layer of a liquid gas contact body formed of corrugated sheets of material. All of the corrugations in each of the sheets of the contact body are disposed at an angle to the horizontal and each of the corrugations extends continuously on substantially straight lines from one edge of the sheets to another edge thereof. The corrugations in alternate sheets cross the corrugations in the sheets disposed between the alternate sheets. The scrubbed gasses passing from the contact body layer are then passed through a mist eliminator structure to remove any remaining water droplets therefrom.

The above, and other objects, features and advantages of this invention will be apparent in the following detailed description of an illustrative embodiment thereof, which is to be read in connection with the accompanying drawings, wherein:

FIG. 1, is a schematic side elevation view, in section, of a coke quenching tower constructed in accordance with the present invention; and FIG. 2, is a slightly enlarged sectional view taken along line 2—2 of FIG. 1.

Referring now to the drawing in detail, and initially to FIG. 1 thereof, a coke quenching tower 10, capable of practicing the method of the present invention is illustrated. The tower shell is of conventional construction, such as are presently in commercial use. Indeed, the method of the present invention is intended to be used in retrofitting existing towers although, of course, it can be used in newly installed towers as well.

The coke quenching tower typically is a tall wooden structure capable of producing a natural draft. The structure has a bottom opening 12 and an open upper end 14. The opening 12 permits access to the interior of the tower for a railroad car 16, or the like, containing the hot coke 18 to be quenched.

The scrubbing system 20 of the present invention is located in the upper end of the tower. The system consists of a first stage 22, which in this embodiment of the invention consists of a two foot depth of liquid gas contact body material. In the presently preferred embodiment of the invention, layer 22 consists of two separate layers 24, 26 of fill material such as, for example, PLASdek tower packing material sold by The Munters Corporation. This material is formed from corrugated sheets of high temperature thermoplastic such as Noryl EN-265, with all of the corrugations in each sheet being disposed at an angle to the horizontal and with each of the corrugations extending continuously on substantially straight lines from one edge of the sheet to another edge thereof. The corrugations in alternate sheets cross the corrugations in the sheets disposed between the alternate sheets in a cross-fluted arrangement. The sheets in layer 24 are disposed perpendicularly to the sheets in layer 26 to provide a more circuitous flow path for gasses rising from the hot coke in car 16, to provide improved removal of particulate matter within the contact body by the countercurrent flow of water and gas. Contact body layers 24, 26 consist of long, rectangular sections, for example, 1 ft.×1 ft.×6 ft. of the fill material, supported by a Fiberglass Reinforced Plastic (FRP) grid of I beams 28 and perpendicularly extending channels 30, supported within the tower in any convenient manner.

Water is supplied to the contact body from a water supply system 31. This system consists of a plurality of header pipes, formed of plastic, or the like, on which spray nozzles 32 are secured. These spray nozzles may be of the conventional commercially available Munters 1-C Cerami-Spray type nozzle spaced 3 ft. on center. In the illustrative embodiments of the invention, water flow rate at the nozzles is 72 gpm/nozzle at 5.5 psig nozzle pressure. With this arrangement of nozzles and water supply pressure, the contact body layer 22 is wetted by water at a total rate of 8 gpm/ft$^2$. (4,000 lbs./hour-ft$^2$.). The resulting pressure drop through this section of the tower then is found to be on the order of 0.15 inches w.g.

The water is sprayed from the nozzles 32 onto the upper surface of the contact body layer 22 and flows through the circuitous passages formed in the contact body layers by the corrugated sheets of material along the surfaces thereof, in countercurrent relation to the gases rising from the hot coke. When the water hits the coke, some of the water is evaporated and particulate matter rises with the water gases into contact body layer 22. In layer 22, heat exchange occurs between the liquid and the gases, with the result that the water is heated and the gases are cooled. In addition to this heat exchange, a mass transfer also occurs, in that the water flowing downwardly into the contact body captures particulate matter in the gases, as well as water-soluble vapors in the upwardly moving gases. In addition, some particulate matter is captured in water as a result of inertial impacts.

It has been found that a tower-packing section 22 of the type described above, in a coke quenching tower, will remove substantially all water-soluble vapors in gases rising from the hot coke, and that it will further remove 99% of all six micron and larger particulate matter.

A second scrubbing layer 40 is located in the tower above the water supply system 30. This layer serves to remove and eliminate from the tower discharge water droplets and/or condensed steam rising from the contact body. This layer consists of a conventional mist eliminator structure, such as sold by The Munters Corporation as the Munters' Series T-271 Mist Eliminator. These eliminators are formed of Noryl EN-265 thermoplastic material, and consist of a series of laterally spaced panels bent in a chevron shape, as shown in FIG. 1, and themselves having corrugated-type surfaces. These eliminator panels are supported on an FRP grid system of I beams and channels, similar to that used for contact body layer 22.

Preferably, an eliminator underside spray system is provided for use in conjunction with layer 40. This will consist of a plurality of automatically controlled nozzles 42 in the header water supply system 30, which can be selectively activated to spray the underside of the mist eliminator panels from time to time in order to wash any particulate matter caught on the eliminator panels. This arrangement prevents any solid build-up on the underside of the mist eliminators.

It has been found that the pressure drop through the mist eliminator section of a cooling tower constructed in accordance with the present invention is 0.10 inches w.g. so that the total pressure drop in the tower is only on the order of 0.25 inches w.g. Thus, with the construction of the present invention, the cooling tower can operate on the natural draft of the tower although, if desired, a fan system for drawing air through the tower may be utilized.

In the cooling tower of the present invention, the water used for scrubbing will have an additional cooling effect on the vapors rising from the hot coke and will condense additional steam vapors, thus reducing the condensation rain which often forms in such towers after discharge of the vapors through top 14. The gas is, in addition, highly scrubbed of particulate matter and water-soluble gases. This is done inexpensively, using the natural draft of the tower.

Although an illustrative embodiment of the invention has been described herein with reference to the accompanying drawings, it is to be understood that the invention is not limited to that precise embodiment, and that various other changes and modifications may be effected therein by one skilled in the art without departing from the scope or spirit of this invention.

What is claimed is:

1. The method of quenching coke and scrubbing the resulting gases comprising the steps of placing a supply of hot coke in an enclosed natural draft tower having an open top, passing water from above to said coke through at least one layer of a liquid gas contact body formed of corrugated sheets of materials arranged with the corrugations in each adjacent sheet crossing each other, passing gases from the quenched coke through said contact body countercurrent to said water to remove particulate matter, liquid drops and water soluble vapors from said gases in said contact body, the pressure drop across the contact body being on the order of 0.15 inches w.g., and thereafter passing said gases through a mist eliminator structure to remove water droplets therefrom, the pressure drop across the mist eliminator being on the order of 0.10 inches w.g.

2. The method as defined in claim 1, wherein said step of passing water through the contact body comprises supplying water to the contact body at a rate of 8 gpm/ft².

3. The method as defined in claim 1, including the step of spraying, at least periodically, said mist eliminator from below.

4. The method of quenching coke and scrubbing the resulting gases comprising the steps of placing a supply of hot coke in a natural draft quenching tower having an opened top, depositing water on the coke from directly above and removing particulate matter and water soluble vapors from gases produced by the contact of the water with the hot coke by passing said gases and the water, before contacting the hot coke, in countercurrent relation through at least one layer of a liquid gas contact body formed of corrugated sheets of material, all of the corrugations in each of the sheets being disposed at an angle to the horizontal and each of the corrugations extending continuously on substantially straight lines from one edge of the sheets to another edge thereof; with the corrugations in alternate sheets crossing the corrugations in the sheets disposed between the alternate sheets; wherein the pressure drop across the contact body is on the order of 0.15 inches w.g. and then passing said gases through a mist eliminator structure to remove water droplets therefrom.

5. The method as defined in claim 4, wherein said step of passing the water and gases through at least one layer of a liquid-gas contact body comprises passing the water and gases in countercurrent relation through two layers of a liquid-gas contact body wherein the corrugated sheets in each layer are positioned at a 90° angle to the sheets in the other layer.

6. The method as defined in claim 4, wherein the pressure drop across said contact body and mist eliminator is on the order of 0.25 inches w.g.

7. The method as defined in claim 6, wherein said step of passing water through the contact body comprising supplying water to the contact body at a rate of 8 gpm/ft².

8. The method as defined in claim 7, including the step of spraying, at least periodically, said mist eliminator from below.

* * * * *